(12) United States Patent
Burmester et al.

(10) Patent No.: US 7,905,253 B2
(45) Date of Patent: Mar. 15, 2011

(54) DOUBLE SEAT VALVE

(75) Inventors: Jens Burmester, Grambek (DE);
Matthias Südel, Ratekau (DE)

(73) Assignee: TUCHENHAGEN GmbH, Büchen (DE)

( * ) Notice: Subject to any disclaimer, the term of this patent is extended or adjusted under 35 U.S.C. 154(b) by 633 days.

(21) Appl. No.: 11/659,108

(22) PCT Filed: Feb. 18, 2006

(86) PCT No.: PCT/EP2006/001483
§ 371 (c)(1),
(2), (4) Date: Feb. 1, 2007

(87) PCT Pub. No.: WO2007/054131
PCT Pub. Date: May 18, 2007

(65) Prior Publication Data
US 2009/0008594 A1  Jan. 8, 2009

(30) Foreign Application Priority Data

Nov. 12, 2005 (DE) .................. 10 2005 054 123
Nov. 25, 2005 (DE) .................. 10 2005 056 624
Dec. 12, 2005 (DE) .................. 10 2005 059 709

(51) Int. Cl.
*F16K 11/20* (2006.01)

(52) U.S. Cl. .................. 137/614.18; 137/240

(58) Field of Classification Search .......... 251/205, 251/328, 333; 137/15.01, 15.06, 238, 240, 137/614.18
See application file for complete search history.

(56) References Cited

U.S. PATENT DOCUMENTS

| | | | | |
|---|---|---|---|---|
| 4,257,442 A * | 3/1981 | Claycomb | ............ | 137/238 |
| 4,757,834 A * | 7/1988 | Mieth | ............ | 137/15.06 |
| 5,904,173 A * | 5/1999 | Ozawa | ............ | 137/240 |
| 6,089,255 A * | 7/2000 | Bonnefous et al. | ............ | 137/312 |
| 6,178,986 B1 * | 1/2001 | Burmester | ............ | 137/240 |
| 6,349,742 B1 * | 2/2002 | Borg et al. | ............ | 137/614.18 |

FOREIGN PATENT DOCUMENTS

| | | |
|---|---|---|
| DE | 196 08 792 A1 | 9/1997 |
| EP | 0 174 384 A | 3/1986 |
| EP | 0 819 876 | 1/1998 |
| WO | 98/54494 A | 12/1998 |

* cited by examiner

*Primary Examiner* — Kevin L Lee
(74) *Attorney, Agent, or Firm* — Merek, Blackmon & Voorhees, LLC (57) ABSTRACT

The invention relates to a double seat valve with cleanable seats, the valve including first and second closing elements (3, 4) and a leakage cavity (5). An intermediate seal (8) seals the closing elements (3, 4) in their opening and closing movements and in the open position against each other, is arranged in the second closing element (4). The second closing element (4) abuts in its closed position at a transition area (2e, 2e*) with a stop face (4e) arranged at a front face of a cylindrical lug (4*) and that directly adjacent to a first seat (2a, 2g), a central recess (4d) is provided in a front face of a second cylindrical lug (4*).

20 Claims, 9 Drawing Sheets

DOUBLE SEAT VALVE

CROSS-REFERENCE TO RELATED APPLICATION

The present application claims the priority under 35 U.S.C. 119 of German Application Nos. 10 2005 054 123.2, filed Nov. 12, 2005; 10 2005 056 624.3, filed Nov. 25, 2005; and 10 2005 059 709.2, filed Dec. 12, 2005, which are hereby incorporated herein by reference in their entireties.

TECHNICAL FIELD

The invention relates to a double seat valve comprising two closing members arranged in series and moveable with regard to each other according to the preamble of claim 1.

BACKGROUND OF THE INVENTION

A double seat valve of the generic type, which is also designated as a double seat valve with cleanable seats due to its function, to allow cleaning of the respective seat exposed by gap-wide opening of its seats, is known from DE 196 08 792 C2. Each of the three seals in the known double seat valve is a discrete seal, wherein each seal only has one function. The first seal in the first closing element is a purely radially acting seal, which slides in the first seat formed as a cylindrical envelope and seals there as a result of the provided bias (seal with sliding engagement). The second seal in the second closing element either acts upon the conical formed second seat such that this can be designated as an axially/radially acting seal (seal with pressing engagement), or a purely radially acting seal is provided here as well (seal with sliding engagement). As a rule, the fixed (metal) stop for limiting the final position of the second closing element (closing position) is also located at the second seat, if a seal with pressing engagement is provided. The third seal, the so-called intermediate seal, deploys its effect, when the first closing element comes to abut at the second closing element through this intermediate seal during the opening lift and carries the second closing element along into the completely open position in the course of the further opening movement (seal with pressing engagement). In this, the intermediate seal is arranged in a front face directed towards the leakage cavity at the second, dependently driven closing element.

The known double seat valve outlined above in short comprises two so-called seat cleaning positions, wherein the first seat cleaning position is created by a first partial lift opposed to the opening lift. In this position the cylindrical lug arranged at the first closing element on the side of the leakage cavity forms a so-called choke gap with the associated cylindrical first seat, through which the amount of cleaning agent supplied from the adjacent first valve housing part can be restricted. The seat cleaning position of the second closing element occurs by a partial lift in the same direction as the opening lift, wherein in the partially open position the cylindrical lug arranged at the second closing element on the side of the leakage cavity forms a second choke gap with the associated part of the connecting opening, which limits the amount of the seat cleaning flow created in this seat cleaning position.

Since the two closing elements and the associated cylindrical lugs comprise different diameters, the respective associated sections of the connecting opening are also of different diameter such that a transition area is obtained between these two diameters. In the seat cleaning position of the first closing element the first seat cleaning flow flows along the cylindrical seat and hits the frontal boundary of the second closing element, wherein it is prevented by the difference in diameter of the two sections of the connecting opening that the first seal cleaning flow directly hits the second choke gap and thus the seat area of the second closing element. In the seat cleaning position of the second closing element, the second seat cleaning flow is diverted radially inwards at the transition area bridging the difference in diameter between the sections of the connecting opening and is guided past the frontal boundary surface of the first closing element. Also in this case it is prevented that the second seat cleaning flow directly hits the first choke gap and thus the seat area of the first closing element.

With the known double seat valve it is possible to limit the amount of cleaning agent used in the respective seat cleaning as desired. However, the requirements to be satisfied by such a double seat valve in certain countries go beyond this. Thus it is demanded in the USA, for example, that in case of larger sealing deficiencies or even the loss of one of the two seat seals in the course of the seat cleaning of the other closing element, no cleaning agent may penetrate through the respective sealing deficiency or the seat area without seat seal, respectively. Under these conditions such a double seat valve is not only subject to the requirement of a restriction of the amount of cleaning agent and the avoidance of a direct admission of the seat areas in the course of the seat cleaning, but also of a discharge possibly free of turbulence of the seat cleaning flow into the leakage cavity at first and into the surrounding from there, without the respective closed seat area being directly hit by this seat cleaning flow or acted upon increasing pressure thereon.

Direct admission means each velocity component from the respective seat cleaning flow directed vertically onto the walls defining the seat area. Namely, it has been noted that each direct admission in this regards results in a conversion of kinetic energy of flow to static pressure. Depending on the impact angle of the flow onto the wall or body surface flown against, a branching flow with a so-called "branching flow line" is obtained, the latter parting the flow into two halves. The branching flow line itself runs against the so-called "stagnation point", such that the velocity is zero at this point. The pressure increase as a result of this stopping of the velocity is also designated as "impact pressure". The above illustrated mechanisms increasing pressure generate a leakage flow across the respective choke gap and the damaged or completely missing seat seal.

Therefore, direct hitting by the seat cleaning flow onto the surface defining the leakage cavity is counterproductive in any case. In the known double seat valve, the first seat cleaning flow, which is generated by lifting the first closing element by the first partial lift, can more or less perpendicularly impact onto the frontal boundary area of the second closing element, which accommodates the intermediate seal. At the place of impact this flow is diverted mainly to the centre of the leakage cavity and the flow i. a. also affects the intermediate seal projecting from the front face. Furthermore, a branching flow line is obtained at the place of impact, the branch of which directed towards the seat area can generate a vortex and an impact pressure there.

Further double seat valves are known (WO 98 54 494 A1; EP 0 819 876 B1), which dispense with the intermediate seal indicated above. In the double seat valve according to WO 98 54 494 A1 the radially acting first seat seal of the first closing element is driven in the course of the opening movement into a cylindrical recess of the same diameter in the second closing element, which is aligned with the cylindrical seat of the first closing element. Only then the second closing element is lifted from its seat by the first closing element and both closing elements together reach the completely open position. In a configuration in this regard the radial seal of the first closing element takes on the sealing in the closed position and also the function of the so-called intermediate seal in the collecting position and the following open position of the double seat valve, wherein the first seat seal acts purely radially (sliding engagement) also in these positions. The second closing element is formed as a seat disk, the seal of which co-operates with a conical section of the second seat, and it is also guided and centred at this conical section. If the seal allows it, a fixed (metal) stop for limiting the final position of the second closing element in the closed position of the double seat valve is provided at the conical section.

In the seat cleaning of the first closing element, the seat cleaning flow is guided along the cylindrical wall of the first seat and the following recess and impacts against the frontal boundary of the cylindrical recess, which is preferably oriented vertically to the flush cylindrical faces. Such a right-angled diversion of the flow is unfavourable as a whole, it detaches uncontrollably from the wall and creates vortexes and circulation flows, which can form impact pressure. The known configuration has a further drawback that the shape of the recess in the second closing element is determined by the shape and dimension of the cylindrical seat in the valve housing. For this reason, there are only restricted possibilities for the fluidic design of this recess guiding and steering the seat cleaning flow.

In EP 0 819 876 B1 a double seat valve with cleanable seats is described, which is also implemented without an intermediate seal and wherein the first seat seal radially acting in the cylindrical valve seat has a double function. This double function consists in that the first seat seal arranged on the first closing element formed as a slide piston comprises simultaneously to a radial sealing function within the cylindrical valve seat an axial sealing function with regard to the second closing element (pressing engagement). This axial sealing function becomes effective again, when the first closing element in the course of the opening movement reaches a so-called collecting position with the second closing element and transfers this into an open position as well then.

As opposed to the double seat valve according to DE 196 08 792 C2 and the double seat valve according to WO 98 54 494-A1, in the double seat valve according to EP 0 819 876 B1 the choke gap at the first closing element is not arranged on the side of the leakage cavity, but on the side averted from the leakage cavity. The cylindrical lug for forming the possible choke gap with the associated surface of the connecting opening is located, with regard to the illustrated position, below the first closing element. In order to remove in this configuration the radially acting first seat seal gap-wide from its associated cylindrical valve seat, an annular recess in the connecting opening is required, into which the first seat seal is driven in the course of the associated seat cleaning. The cylindrical lug at the first closing element forms the desired choke gap with an associated section of the connecting opening below this annular recess then. Regarding the sole choke gap effect, the rearrangement of the choke gap from a position on the side of the leakage cavity to one averted from the leakage cavity may be equivalent, however, a situation critical regarding cleaning for the first seat seal in the first closing element arises from this modification, when the first closing element is transferred to its seat cleaning position. In this case there is the risk that at least partial amounts of the second seat cleaning flow impact directly onto the sealing area of the first closing element, because the cylindrical lug forming the choke gap is missing, which is usually arranged in front of and shields this first seat seal.

Seat seals of double seat valves comprising double functions in the manner described above are not without problems, as they have to satisfy different requirements and their sphere of action is not clearly defined and limited, as it is the case with discrete seals each comprising an exclusively radial or exclusively axial/radial or exclusively axial function. Due to the fact that a single seal acts purely radially on the one hand and must assume in a more or less directly adjacent area axial or axial/radial, respectively, sealing functions, these respective sealing areas have to be brought together relatively closely in order to avoid that the seal will obtain unnecessary large dimensions. In the present case the purely radially acting sealing area must remain that long in the cylindrical seat, until the axially/radially acting area has come to abut against the other closing element. The part of the seat seal with double function bridging the two sealing areas indicated above is as a ruled distanced from the cylindrical seat such that between seal and cylindrical seat a sump-like, deep notch arises, which presents an area critical with regard to cleaning.

It is the object of the present invention to further develop a double seat valve of the generic type such that a discharge possibly free of turbulence of the seat cleaning flow into and out of the leakage cavity is ensured and a direct admission of the seat area is definitely avoided.

SUMMARY OF THE INVENTION

The object is achieved by a double seat valve comprising the features of claim 1. Advantageous embodiments of the double seat valve with cleanable seats according to the invention are described in the dependent claims.

The present invention is based on the basic features of the known double seat valve according to DE 196 08 792 C2, wherein use is made here especially of the cylindrical lug arranged at the respective closing element on the side of the leakage cavity for the formation of the respective choke gap. Above that, the present invention uses the difference in diameter of these cylindrical lugs, which allows the formation of a transition area between the sections of different diameter of the connecting opening, which are associated with the cylindrical lugs. The principle of the separate intermediate seal, which has the object to seal the two closing elements against each other in the so-called collecting position and in the implementation of the further opening movement up to the open position, is kept therein in any case, the inventive solution being by no means only restricted to one of the two possible arrangements regarding the position of the intermediate seal. The inventive solution allows either the arrangement of the intermediate seal in the front face of the second closing element or, alternatively, in the front face of the first closing element.

In order to achieve the object forming the base of the present invention, a first inventive basic idea includes to lead the seat cleaning flow discharging from the associated choke gap in the respective seat cleaning process into the leakage cavity possibly free of turbulence and obstructions and to discharge it from there into the surroundings in the same manner. This is achieved on the one hand by a new flow contour guiding and steering the seat cleaning flows in the leakage cavity. This new flow contour ensures in the seat cleaning of the first closing element arranged at the bottom that the first seat cleaning flow follows the wall form in the area of the first seat free of detachment. Thereafter, a smooth diversion of this first seat cleaning flow occurs in a central recess, which is provided in a front face of the cylindrical lug of the second closing element, such that the latter flow can arrive in a discharge bore centrally arranged in the first closing element without colliding and forming pressure impact thereby with the first closing element in the area of its areas bounding the leakage cavity or with the intermediate seal. The central recess is formed substantially by a rotationally symmetrical diversion area, which starts on the outside at said front face of the second closing element and which is bounded on the front side by a front face oriented substantially perpendicular with regard to the longitudinal axis of the second closing element, the diversion area leading into the front face.

Substantial is the smooth diversion of the seat cleaning flow in the diversion area. This is achieved according to the invention in that, viewed in vertical centre section, the diversion area comprises a contour with an unbent shape, wherein a directional vector in the outlet point of the diversion area under the conditions indicated above points towards the discharge bore arranged centrally in the first closing element. It is further substantial that at the starting point of the contour a second circumferential edge is formed, which is directly adjacent to a first end section of the first seat in the closed position of the second closing element.

It is substantial with regard to the flow guiding of the second seat cleaning flow generated by slight lifting of the second closing element that this flow defined detaches at a first circumferential edge formed by the transition area and the first end section of the first seat and is guided safely tangentially past the surfaces bounding the first closing element in the area of the leakage cavity. For this purpose a safety distance is provided between the first circumferential edge and the possible areas of the first closing element, which prevents an impact in this regard under all possible functional circumstances.

A second inventive basic idea includes, not to implement the limitation of the final position of the second closing element (slide piston with radially acting seal in sliding engagement or, if applicable, seat disk with radially/axially acting seal in sliding/pressing engagement) in its closed position at the seat area co-operating with the seal, as this is regularly the case regarding known double seat valves of the generic type, but to shift the fixed (metal) lug of the second closing element, which is desirable, but not implemented or implementable in all cases, to the end of the associated choke gap averted from the seal. This is achieved according to the invention in that the second closing element abuts in its closed position with a stop face arranged at a front face of its cylindrical lug against the transition area, and that directly adjacent to the first seat. By this provision, which is unknown in the prior art, the gap existing up to now and located adjacent to the leakage cavity between the second closing element and the valve housing is eliminated, wherein it is a metal closure as a rule. Thus, cleaning agent cannot reach the second seat seal, which is damaged, if applicable, or completely missing, if applicable, in the course of the seat cleaning of the first closing element through the existing choke gap between the cylindrical lug at the second closing element and the cylindrical recess in the valve housing.

Such a closing of this critical gap was not possible up to now, since a redundancy in determination would have been present by the stop face in the seat area of the second seat seal. Substantial in the implementation of the second inventive basic idea is that the respective stop faces at the second closing element and at the valve housing contact each other directly, along the complete circumference and, as far as this is possible regarding fixed or metal contact, respectively, close to the leakage cavity. For this purpose, a sufficient central guiding of the second closing element in the valve housing and a sufficient centricity of all components participating in this guiding of the double seat valve is required.

In order to additionally counteract a canting of the second closing element in the course of its closing movement, the end section of the second cylindrical lug is, according to an advantageous configuration, configured radially on the outside following the stop face such that an annular circumferential centring point is formed. This centring point is, viewed in radial direction, shifted towards the outside as far as possible and as near as admissible approximated to the shape of the transition area defined by a radius of curvature. This is achieved by an annular circumferential second chamfer, which is provided at the end section and which extends against the stop face under an angle of chamfer and which forms, together with the second diameter of the second cylindrical lug, a third circumferential edge produced by rounding and ensuring the centring in the transition area.

According to a first proposal, the intermediate seal is arranged in the front face of the second closing element, wherein a point in the front face of the recess radially inward of the diversion area being possible in this regard. In this it must be ensured that the diverting function of the diversion area mainly formed by the recess is provided for the second seat cleaning to start with, and that the second seat cleaning flow does not experience any obstruction in its further course at the intermediate seal such that turbulence is formed and detachment occurs in the leakage cavity, which can result in local formation of impact pressure. In the present case, the first closing element provides a sealing face for this intermediate seal at an associated surface of its end section.

A further proposal envisions to arrange an alternative intermediate seal in the frontal boundary of the cylindrical lug of the first closing element, said alternative intermediate seal preferably co-operating with the front face of the recess in the second closing element, that is with an area radially inwards of the diversion area. However, other contact points are also possible, wherein the diversion area itself is not to be excluded either.

In both variants for arranging the intermediate seal, the safety distance of the first closing element from the direction vector at the exit point of the transition area in the first end section is dimensioned such that it is at least as large as the sum of all production tolerances of the components of the double seat valve, which determine in the closed position of the first closing element its smallest axial distance to the transition area. If the alternative intermediate seal is arranged in the first closing element, this safety distance must be increased by an amount, by which it projects from the frontal boundary of the cylindrical lug.

A further proposal envisions that a direction vector is flush with the first end section of the first seat at the starting point of the contour of the diversion area. This preferred embodiment ensures a largely smooth entry of the first seat cleaning flow into the diversion area and thereby into the recess of the second closing element. The condition indicated above must be complied with for a cylindrical end section aligned with the cylindrical first seat as well as for a conical expanding first end section (a so-called inlet slope), which is also provided within the scope of the invention. In this, the conical expanding end section can comprises exclusively bent or bent and linear contour elements.

Satisfying results with regard to a smooth diversion are still achieved also according to a further proposal, if a direction vector at the starting point of the contour of the diversion area deviates from the direction vector of the first end section by a second diversion angle of less than 15 degrees. A larger second diversion angle results in the formation of impact pressure and is therefore counterproductive.

The first inlet slope proposed by the invention facilitates the insertion of the first seal into the cylindrical first seat and reduces the wear of this seal thereby. However, with regard to fluidics this inlet slope constitutes rather a disadvantage, since it delays the first seat cleaning flow by increasing the flow cross-section and thus constitutes a detachment risk for the flow. It is proposed in this connection to provide the first end section forming the first inlet slope by at least one envelope of cone. In order to avoid detachment of the seat cleaning flow from the contour of this envelope of cone it is proposed, to bend the end section by an angle of pitch, which ranges between 0 and 15 degrees, preferably ranges between 5 to 15 degrees and is here implemented, again preferably, with 15 degrees.

In order to configure the first inlet slope more resistant against detachment, a further proposal envisions that the first end section is formed by two envelopes of cone merging into each other and rounded by a radius of curvature, wherein a second envelope of cone directly following the first seat is inclined by a second angle of pitch against the first seat and the other envelope of cone by a first angle of pitch with regard to the first seat. In this the first angle of pitch is implemented in the range from 7.5 to 15 degrees, preferably with 15 degrees and the second angle of pitch in the range of 5 to 10 degrees, preferably with 7.5 degrees.

It has further proven beneficial with regard to avoiding any formation of impact pressure, if the first circumferential edge formed by the transition area and the first end section is rounded with a smallest possible corner rounding. In the ideal case a sharp-edged configuration it to be provided here, which is not admissible for functional and practical reasons (endangering of the first seal), though.

According to a further proposal, the annular recess in the housing forms an obtuse or a vertical first diversion angle with the transition area, wherein the vertical diversion angle (90 degrees) is preferred, since a secure flow free of collision over the first closing element can be ensured most likely. In this, the transition between the recess and the transition area is rounded with a radius of curvature.

In order to avoid formation of impact pressure during the entry of the first seat cleaning flow into the diversion area in the second closing element, a further proposal envisions that the second circumferential edge formed by the stop face and the diversion area is rounded with a smallest-possible second corner rounding. A sharp-edged transition in this area is not admissible for functional and practical reasons, a relatively large radius of curvature is counterproductive and results in undesired formation of impact pressure.

In order to avoid that the first seat cleaning flow having left the diversion area flows against the intermediate seal or the front face of the recess and forms impact pressure thereby, it is further envisioned that the diversion area undercuts the front face by an axial undercutting distance. Thereby the contour of the diversion area in the area of its outlet point can be pitched by a fourth diversion angle with regard to the front face such that the first seat cleaning flow just tangents the intermediate seal, is slightly diverted thereby towards the second closing element and can then follow the wall shape of the adjacent front face of the recess in order to clean it. It has been proven as beneficial, if the fourth diversion angle is implemented in the range of 5 to 20 degrees, preferably with 15 degrees.

In terms of an optimum flow guiding of the first seat cleaning flow, a contour has proven itself, which comprises a sequence of sections, wherein the first section, the third section and the fifth and last section leading out of the front face are each embodied linear, and wherein these sections are connected with each other through the second and the fourth section, which round-off the three above sections tangentially with a largest-possible first and second radius of diversion.

A similarly satisfying flow result is achieved according to a further proposal in that the contour is made up of a sequence of bent sections, which have a common tangent line at their respective transition points. An other embodiment envisions that the contour consists of a single section of continuously varied curvatures. Finally it is proposed as well that the contour is formed by a single section of constant curvature.

In order to ensure a perfect and disturbance-free discharge of the cleaning agent under all pressure and velocity conditions, it is envisioned that the frontal boundary of the first closing element directed towards the leakage cavity comprises a chamfer circumferential on all sides and dropping towards the discharge opening. This chamfer is suitably configured as an envelope of cone, which is inclined within the range of 10 to 20 degrees, preferably 15 degrees with regard to the base of the cone.

In order to avoid formation of turbulence and impact pressure not only in the area of the seats of the double seat valve described above, it is advantageous, if any internal fittings and obstructions in the remaining leakage cavity are omitted, as far as this is constructively possible. In this regard a further proposal envisions that a first shifting rod connected with the first closing element concentrically penetrates a second shifting rod configured as a hollow rod and connected with the second closing element, continues flying through the discharge bore and is, at an end of the first closing element averted from the second closing element, fixedly connected with the first closing element through at least one substantially radially oriented traverse. Thereby the usual struts and other connecting means otherwise usual in the area of the leakage cavity are avoided and are relocated at an end located relatively far away from the leakage cavity, where they cannot have any disturbing influences on the flow guiding any more.

In this connection is it also proposed that three traverses equally spaced across the circumference are firmly provided at a shifting rod section, which are each firmly connected radially on the outside with a circumferential ring, and that the shifting rod section, the traverses and the ring form an integral welding part. In this it is further advantageous that the welding part connects on the outside via the ring to a pressure balance piston bounding a section of the discharge bore remote from the leakage cavity and on the inside via the shifting rod section to the first shifting rod, and that the ring is enlarged in its inner diameter with regard to the diameter of the discharge bore and the intermediate arrangement of a conical expanding transition area such that the inner passage of the discharge bore is not narrowed by the traverses.

As, based on the second inventive basic idea, the metal stop face required in the prior art up to now in the seat area of the second closing element is omitted, more degrees of freedom for the configuration of the second closing element are now obtained in this area as opposed to known solutions. In principal, purely radially, radially/axially and, possible under certain conditions, also purely radially acting second seals can be provided.

The invention according to a first configuration envisions in this connection that the second seat is configured cylindrically and formed by the annular recess, that the second closing element comprises a second seal, which radially seals against the second seat in sliding engagement. In order to facilitate the insertion of the second seal into the second seat, it is envisioned in this regard that the second seat comprises a second end section (second inlet slope) expanding towards the second closing element. This second inlet slope is pitched with regard to the second seat by a third angle of pitch, preferably in the area of 7.5 to 15 degrees, preferably with 10 degrees.

As the second seal experiences an elastic reshaping during extension from the second inlet slope, which has such an effect that is remains longer as desired in contact with the inlet slope, which obstructs flow, a further proposal envisions that the second inlet slope expands at its end directed towards the second closing element into an opening slope, the latter being pitched with regard to the second seat by an opening angle preferably in the range of 35 to 55 degrees, preferably with 45 degrees. Thereby, a desirable cross-section expansion is provided in the area of the opening slope such that the second partial lift required to ensure an unobstructed second seat cleaning flow can be reduced.

A second configuration relating to the second seat envisions that the second seat is embodied cone-shaped and inclined with regard to the cylindrical recess by a seat angle, and that the second closing element comprises a second seal, which seals axially/radially against the second seat in sliding/pressing engagement. In this, the seat angle is set in the range between 25 and 35 degrees, preferably with 30 degrees. Also here it is provided for the reduction of the second partial lift ensuring the second seat cleaning flow that the second seat expands at its end directed towards the second closing element into an opening slope, wherein the latter is pitched with regard to the cylindrical recess by an opening angle as quantified above.

It is proposed according to a third configuration that the second seat is arrange vertically to the longitudinal axis of the double seat valve and that the second closing element comprises a second seal, which seals axially against the second seat. However, such a solution with the advantages of a purely axially acting seal and a purely axially acting seat disk is only possible, if the seal has such a ductile nature that the fixed and metal, if applicable, abutment of the second closing element with its stop face against the transition area is ensured under any conditions.

BRIEF DESCRIPTION OF THE DRAWINGS

Embodiment examples of the proposed double seat valve with cleanable seats according to the invention are illustrated in the drawing and are described below according to construction and function. It is shown in FIG. 1 in longitudinal section the double seat valve with cleanable seats in a first embodiment, and that in the seat area and below it, wherein the double seat valve is in its closed position and an intermediate seal is arranged in the second closing element.

DETAILED DESCRIPTION OF THE PREFERRED EMBODIMENTS

The double seat valve 1 (FIG. 1) according to the invention consists in a first embodiment substantially of the valve housing 10 comprising a first and a second valve housing part 1a and 1b, respectively, the two closing elements 3 and 4 moved independently from each other with the associated shifting rods 3a and 4a, respectively, and a seat ring 2, which creates a connection between the valve housing parts 1a, 1b through a connecting opening 2c on the inside.

Figure 1:
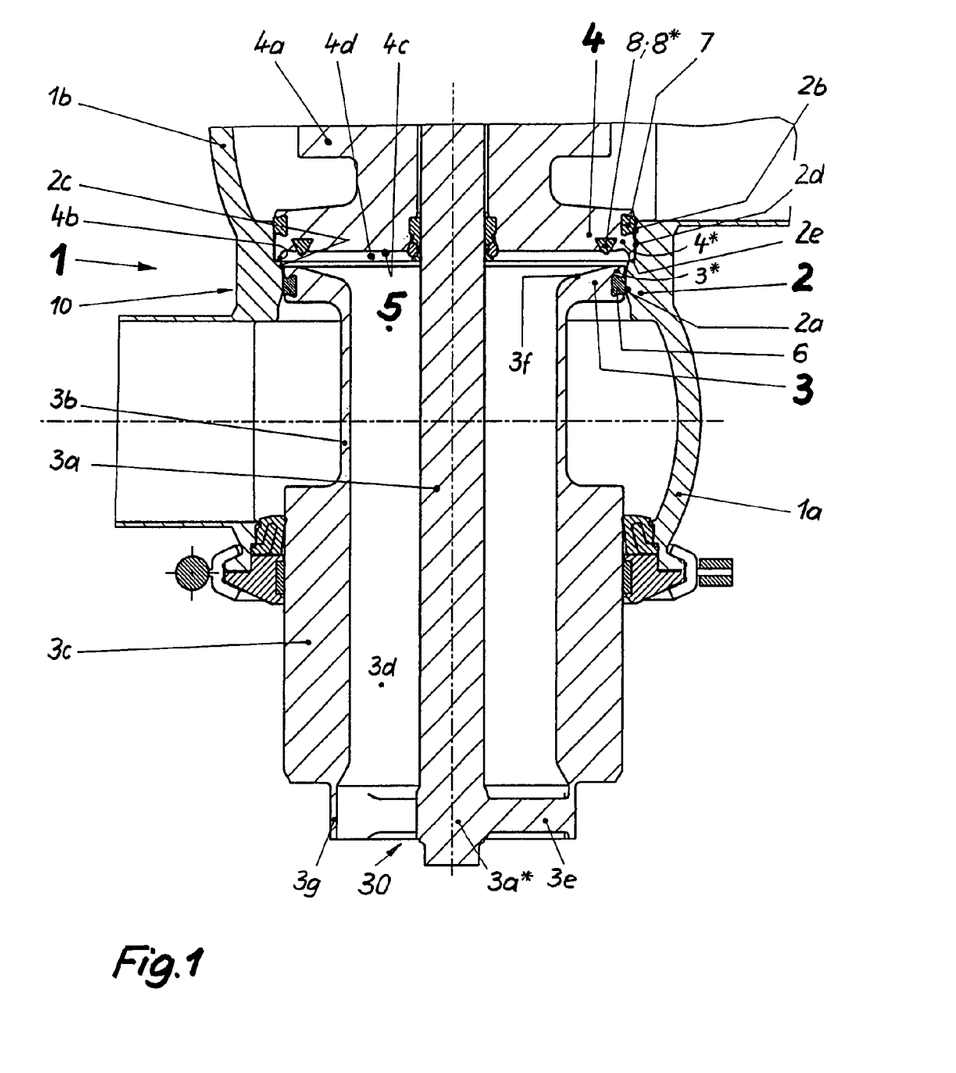

The first closing element 3 formed as a slide piston (active closing element) is received in sealing manner in the closed position of the double seat valve 1 in the first seat 2a formed by the connecting opening, which is configured as cylindrical seat. For this purpose, a first seal 6 is provided in the slide piston 3, which co-operates with the first seat 2a exclusively through radial bias (radial seal with sliding engagement). The second closing element 4 also formed as a slide piston co-operates with a second seat 2b in the closed position of the double seat valve 1, which is configured cylindrically and formed by an annular recess 2d. The sealing occurs through a second seal 7, which seals radially against the second seat 2b in sliding engagement.

Figure 3:
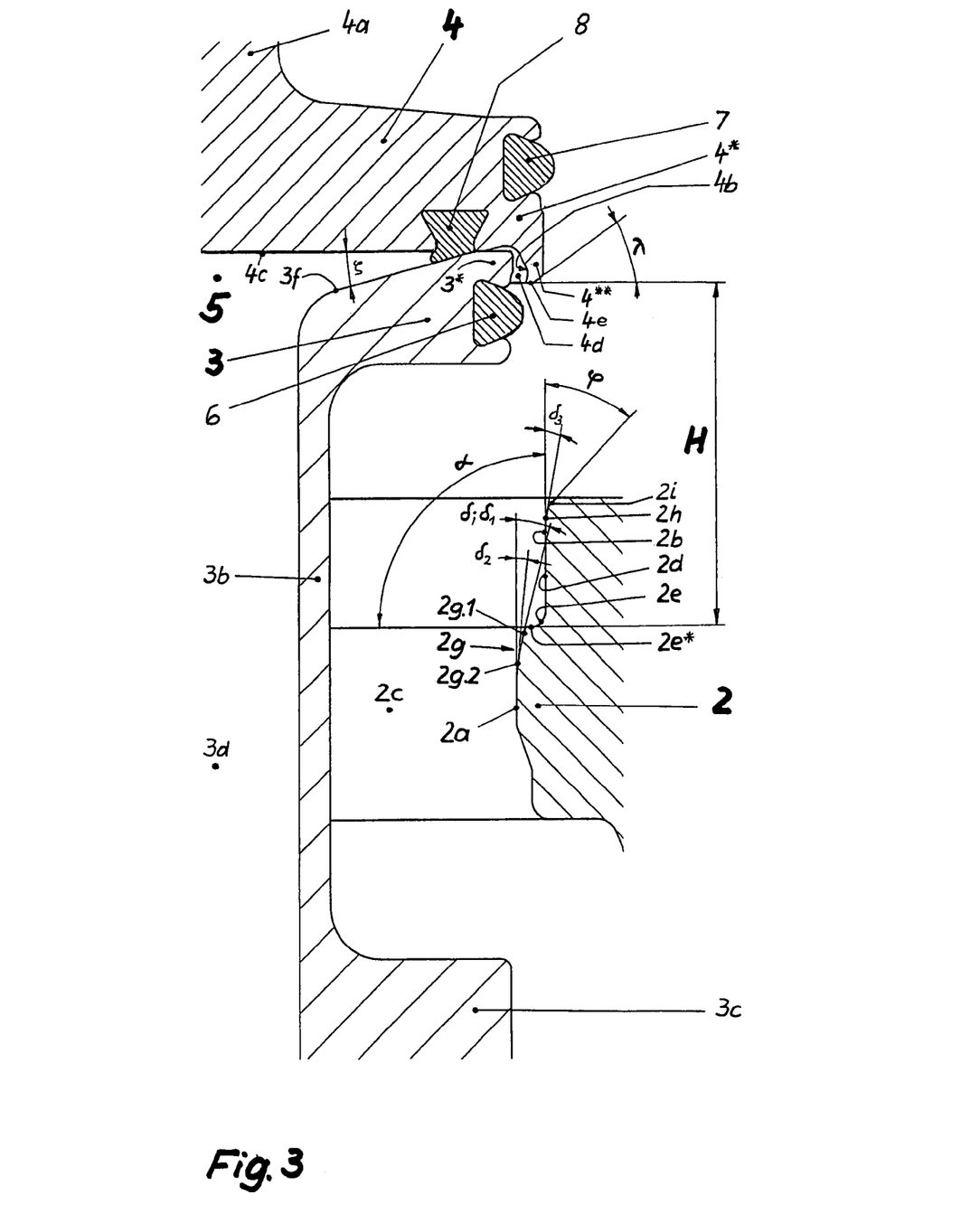
FIG. 3 in longitudinal and cut-out section the seat area of the two closing elements of the double seat valve according to FIG. 2, wherein this is in its open position.

The two closing elements 3, 4 form a leakage cavity 5 between them in the illustrated closed as well as an open position (FIG. 3), which is connected with the surroundings of the double seat valve 1 through a discharge bore 3d, which centrally penetrates a connecting part 3b following the first closing element 3 and a pressure balance piston 3c continuing at the connecting part.

Usually the first shifting rod 3a is fixedly connected with the first closing element 3 in the area thereof through several webs penetrating the discharge bores 3d in star-shape and in radial direction. Since these webs can have negative reactive effects on the flow conditions and the flow pattern in the leakage cavity 5, it is envisioned in the double seat valve 1 according to the invention to shift these mechanically required connecting points in form of three traverses 3e equally spaced across the circumference by a certain distance away from the leakage cavity 5, preferably towards the end of the pressure balance piston 3c averted from the first closing element 3. The fixed connection with the latter piston occurs through a circumferential ring 3g, to which the traverses 3e are fixedly connected on the outside. Suitably the traverses 3e, the ring 3g and a shifting rod section 3a* are combined in an integral welding part 30.

Figure 4:
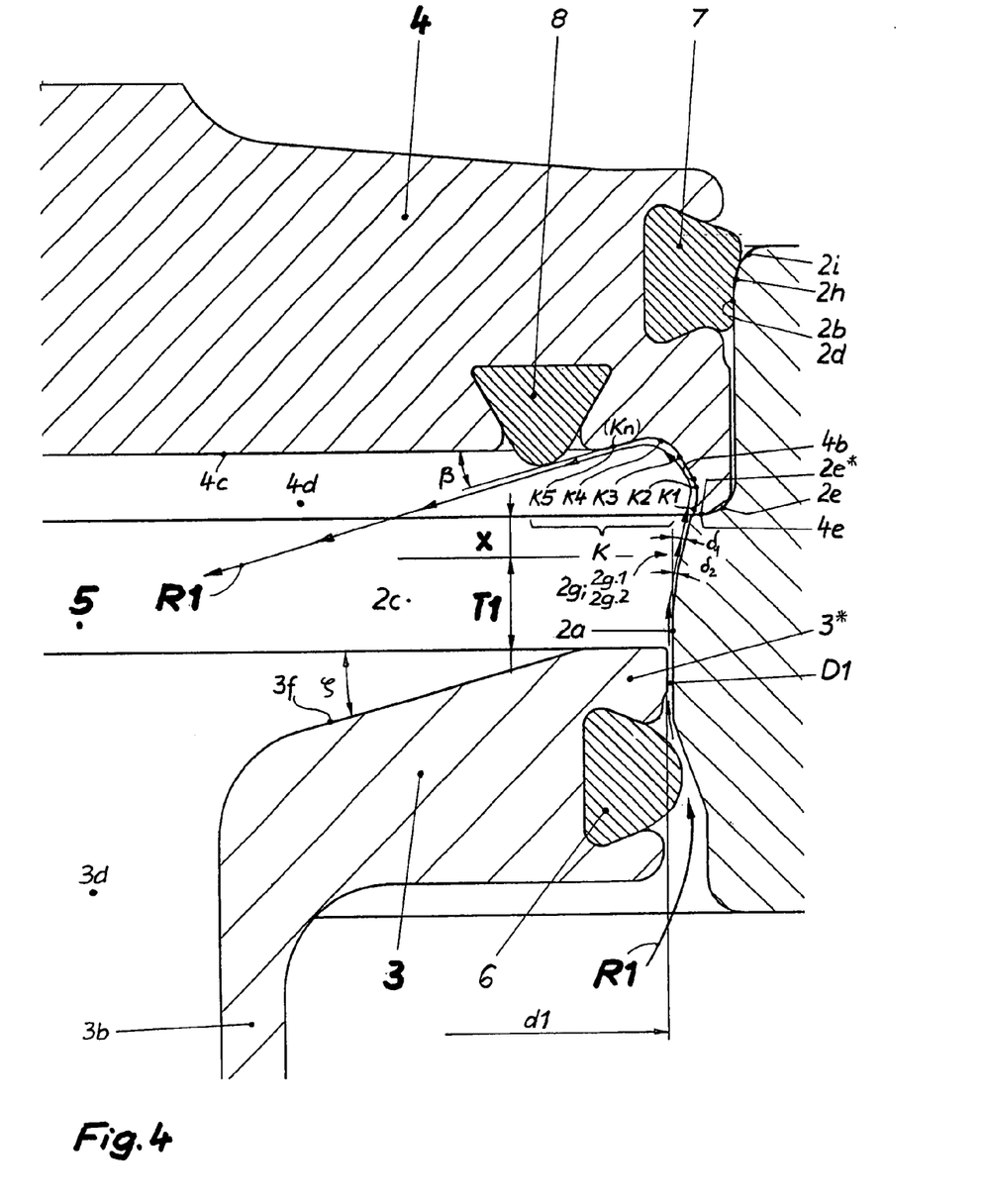
FIG. 4 in longitudinal and cut-out section the double seat valve according to FIG. 2, wherein the independently driven first closing element lying at the bottom and formed as a slide piston is in its seat cleaning position.

Each closing element 3, 4 comprises on the side of the leakage cavity a cylindrical lug 3* or 4*, respectively, which forms an annular first choke gap D1 (cf. also FIG. 4) or an annular second choke gap D2 (cf. also FIG. 5), respectively with the associated part of the connecting opening 2c in the seat ring 2.

The FIGS. 2 to 5 clarify in connection with FIG. 1 details of the seat area for the double seat valve 1 in its first embodiment. The latter is characterised in that, i. a., an intermediate seal 8 sealing the closing elements 3, 4 in their opening and closing movement and in the open position (FIG. 3) against each other, is arranged in the second closing element 4. The first closing element 3 forms the first choke gap D1 with its cylindrical lug 3* (FIG. 4), which comprises a first diameter d1, and with the associated first seat 2a of the connecting opening 2c. The second closing element 4 in the same manner forms the second choke gap D2 with its second cylindrical lug 4* (FIG. 5), which comprises a second diameter d2, together with the annular, cylindrical recess 2d in the connecting opening 2c.

Figure 5:
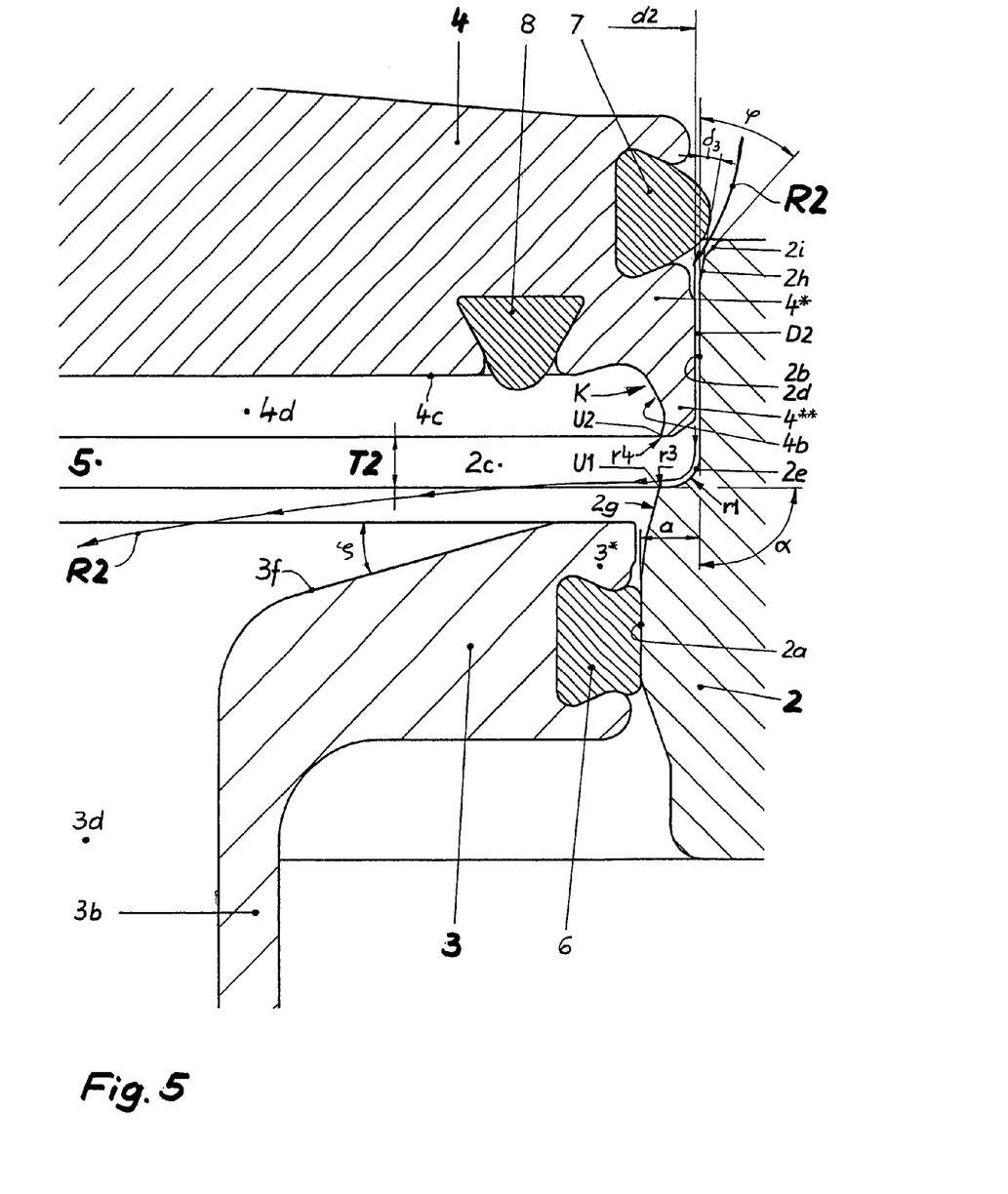
FIG. 5 in longitudinal and cut-out section the double seat valve according to FIG. 2, wherein the independently driven second closing element lying on top and formed as a slide piston is in its seat cleaning position.

The half of the difference in diameter between the annular recess 2d and the first seat 2a (FIG. 2) is designated with a (radial width of a transition area 2e). In this radial extension area a, the transition area 2e between the first seat 2a and the annular recess 2d is provided, wherein the end second of the transition area 2e leading into the first seat 2a forms a preferably vertical first diversion angle α with the cylindrical envelope of the annular recess 2d (FIG. 5). In this, the annular recess 2d comprises in the connecting opening 2c a rounded transition configured with an angle of curvature r1 with regard to the transition area 2e, said angle of curvature r1 being configured with r1<a. The radial width a is configured such large that a second seat cleaning flow R2 exiting from the second choke gap D2 into the leakage cavity in the seat cleaning position of the second closing element 4 is diverted at the transition area 2e towards the centre of the leakage cavity 5 and securely across the first closing element 3. In order to ensure that the second seat cleaning flow R2 is not diverted too early towards the first closing element 3, a first circumferential edge U1 formed by the transition area 2e and a first end section 2g is rounded with the smallest-possible first corner rounding r3, whereby a defined flow break-off point arises at this point.

It is ensured by this provision that the second seat cleaning flow R2 exiting from the second choke gap D2 is not directed onto the seat area of the first seal 6. Above that, the radial width a of the transition area 2e must also ensure the implementation of a stop face 2e* (FIG. 2) on the valve housing side for the second closing element 4, in order to be able to realise the second inventive basic idea, that is a fixed (metal) stop of the second closing element 4 directly adjacent to the leakage cavity 5 on the seat ring 2. The stop face 2e* on the valve housing side communicates with a stop face 4e provided at the front face of an end section 4** of the second cylindrical lug 4* (cf. also FIG. 9), which, viewed in radial direction, comprises a width b. The stop face 2e* on the valve housing side and the stop face 4e on the closing element side are each configured linear; the radius of curvature r1 of the transition area 2e connects tangentially to the stop face 2e*.

Figure 2:
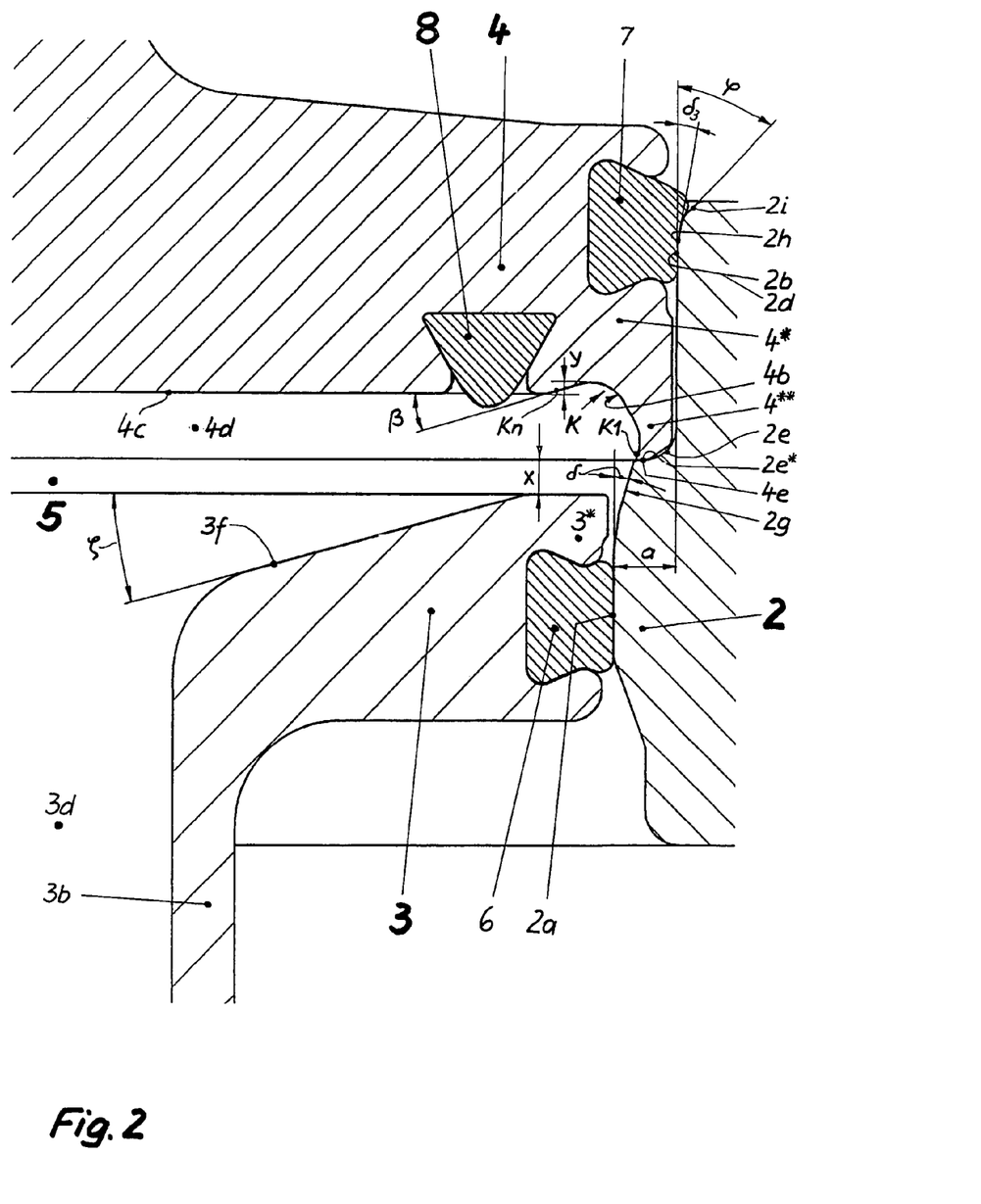
FIG. 2 in longitudinal and cut-out section an enlarged illustration of the seat area of the double seat valve according to FIG. 1.

A central recess 4d is provided in a front face of the cylindrical lug 4* of the second closing element 4 (FIG. 2), which starts radially on the outside with a rotationally symmetrical diversion area 4b and forms a second circumferential edge U2 (FIG. 5) there and is bounded on the front side by a front face 4c oriented substantially perpendicular to the longitudinal axis of the second closing element 4, the diversion area 4b leading with a fourth diversion angle beta into the front face 4c. The second circumferential edge U2 is in the closed position of the second closing element 4 (FIGS. 5 and 2) directly adjacent to the first end section 2g of the first seat 2a. Viewed in vertical centre section the diversion area 4b has a contour K with unbent shape, wherein a first section K1 of the contour K adjacent to the first end section 2g continues across further sections K2, K3 to Kn (FIG. 4), and the direction vector in the end point of the last section K5 or Kn, respectively, points into the discharge bore 3d centrally arranged in the first closing element 3, without colliding with the first closing element 3 in the area of its areas bounding the leakage cavity 5 or the intermediate seal 8 and thus without forming impact pressure. In order to be able to guide a first seat cleaning flow R1 tangentially past the intermediate seal 8 (FIG. 4), the diversion area 4b undercuts the front face 4c by an axially undercutting distance y (FIG. 2). A frontal boundary of the first closing element 3 directed towards the leakage cavity 5 comprises a safety distance x from the direction vector at the exit point of the transition area 2e into the first end section 2g, which is formed as the first circumferential edge U1 indicated above (FIG. 5).

When in the open position of the double seat valve (FIG. 3) a complete opening lift H is implemented, it becomes apparent that the intermediate seal 8 arranged in the recess 4d provides for a safe sealing of the two closing elements 3, 4 between the valve housing on the one hand, and the leakage cavity 5 on the other hand.

FIG. 2 clarifies that the first section K1 is flush with the first end section 2g. In this the first end section 2g can be formed as conical section (first inlet slope) with exclusively bent or bent and linear contour elements, which connects to the seat 2a with a radius of curvature r2 (cf. also FIG. 8) and opens towards the second closing element 4. The first end section 2g is inclined by an angle of pitch δ against the first seat 2a. The angle of pitch δ is configured in a range from 0 to 15 degrees, preferably a range from 5 to 15 degrees and is, again preferably, δ=15 degrees.

Figure 8:
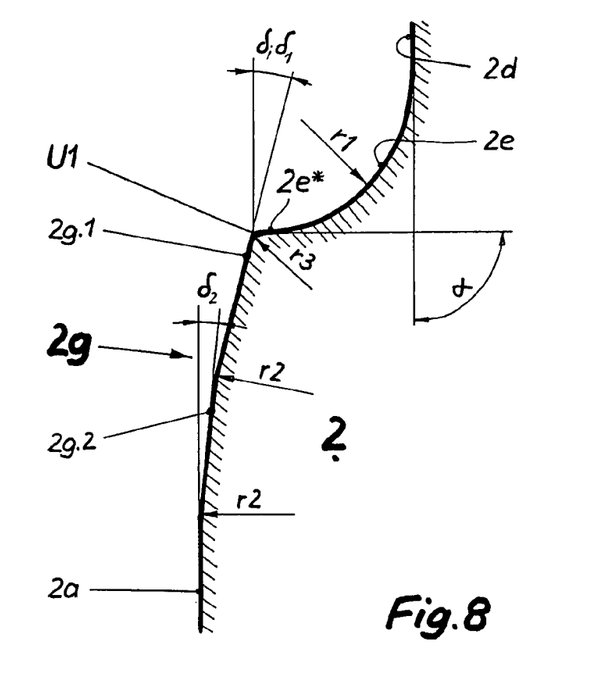
FIG. 8 in schematic and enlarged illustration a contour of the seat area for the first closing element and the adjacent transition area for a double seat valve according to FIG. 2 or FIG. 6.

A further optimisation of the first end section 2g in form of a further improved inlet slope is distinguished according to FIG. 8 in that the first end section 2g is formed with two envelopes of cone rounded with the radius of curvature r2 and merging into each other, a second envelope of cone 2g.2 directly connecting to the first seat 2a being inclined by a second angle of pitch $δ_2$ against the first seat 2a and the other envelope of cone 2g.1 by a first angle of pitch $δ_1$ against the first seat 2a. The first angle of pitch $δ_1$ is configured in the range of 7.5 to 15 degrees, preferably $δ_1$=15 degrees, and the second angle of pitch is preferably in the range of 5 to 10 degrees, preferably $δ_2$=7.5 degrees. Furthermore it is shown in FIG. 2 that the front face of the first closing element 3 is provided with a conical chamfer 3f declining towards the discharge bore 3d, said chamfer being preferably configured as an envelope of cone and being inclined with regard to the base of the cone by an angle of inclination ξ. This angle of inclination ξ is preferably configured in the range of 10 to 20 degrees and here again preferably ξ=15 degrees.

The first seat cleaning flow R1 exiting from the first choke gap D1 (FIG. 4) after implementation of the first partial lift T1 in the course of the seat cleaning of the first closing element 3 flows at first vertically along the first seat 2a, follows the shape of the first end section 2g formed as first inlet slope or of the envelopes of cone 2g.2 and 2g.1 without detaching and enters smoothly into the diversion area 4b of the recess 4d, is diverted there in correspondence with the contour K, leaves the fifth and last section K5 (K5=Kn) with the fourth diversion angle β, tangents the intermediate seal 8, largely tangentially joins the front face 4c and finally reaches the area of the discharge bore 3d.

Figure 9:
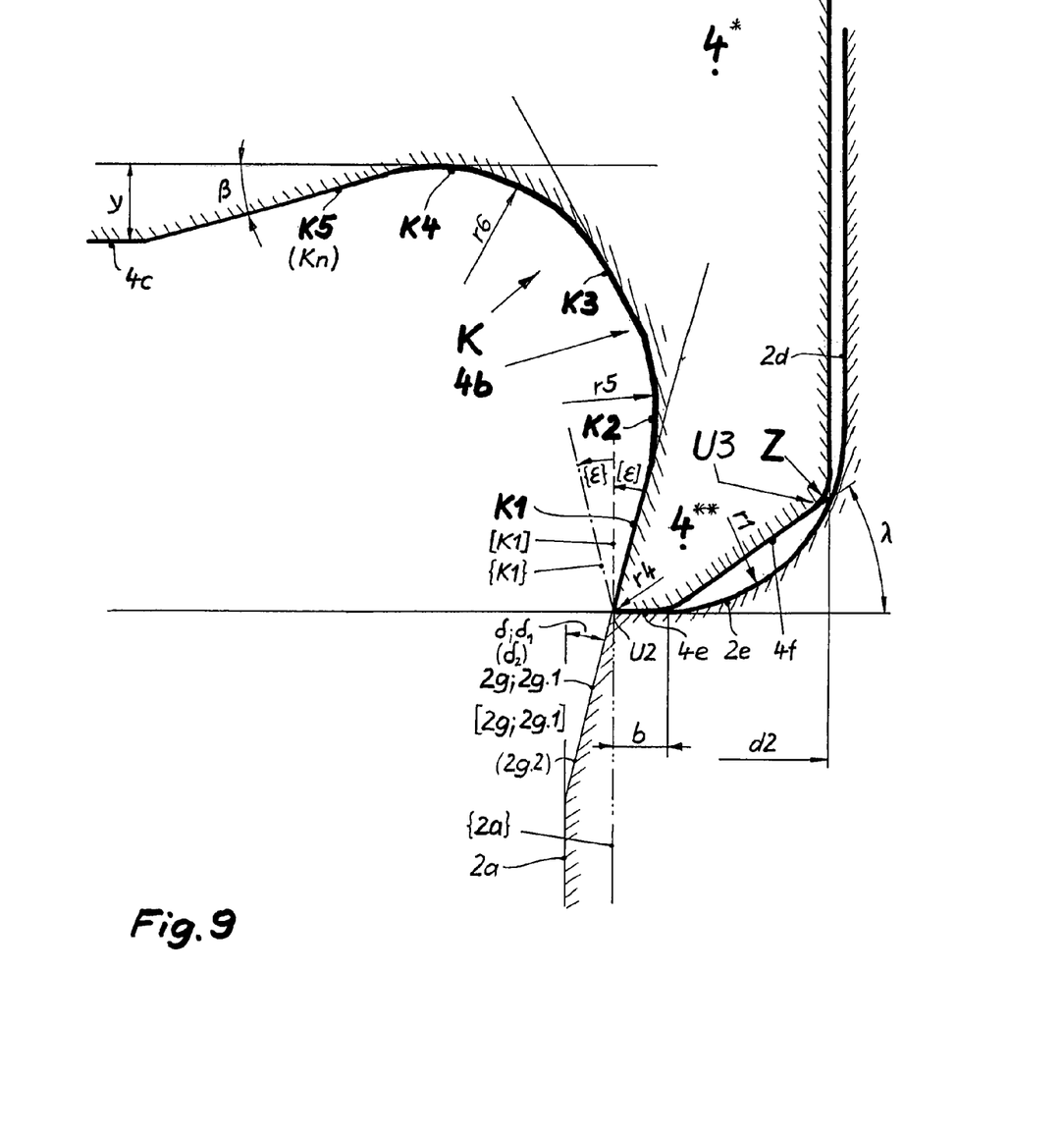
FIG. 9 in schematic and enlarged illustration a contour of the recess in the second closing element in the area of the diversion area and its adjacent seat area.

The detailed shape of the contour K with unbent extension can be seen in detail in FIG. 9. The first section K1, a third section K3 and a fifth and last section K5 (K5=Kn) leading out of the front face 3c are each configured linear, and these sections K1, K3 and K5 are connected with each other through a second and a fourth section K2, K4, which tangentially round-off the latter with a largest-possible first and a second diversion radius r5, r6. It becomes apparent that the first section K1 is flush with the first end section 2g. In order to ensure that the first seat cleaning flow R1 (cf. in this regard also FIG. 4) cannot form impact pressure at the second circumferential edge U2, the latter is directly adjacent to the first end section 2g in the closed position of the second closing element 4 and is rounded with the smallest-possible second corner rounding r4.

A further configuration of the diversion area 4b envisions that the contour K consists of a sequence of bent sections K1 to Kn (for example arc of circle, ellipses, parabolas, hyperbolas), which each have a common tangent at their respective transition points. According to another configuration, the contour K is formed by a single section of continuously varying curvature (for example spiral or an other mathematically closed describable shape of curvature). According to a further proposal, the contour K is configured with a single section having a constant curvature (for example a single arc of circle with the required tangential entry and exit).

It is certainly possible to design the first section K1 such that it is not flush with the first end section 2g or 2g.1, respectively (cf. shape [K1] in FIG. 9). A pitching of the first section [K1] by a second diversion angle [ε] is possible, if the latter stays below 15 degrees. Otherwise impact pressure is formed in the area of the second circumferential edge U2.

If the first end section 2g or 2g.1 is not formed as an inlet slope, but follows the shape of the first seat 2a and is configured cylindrically up to its end (cf. shape {2a} and {K1} in FIG. 9), the first section can be flush with the first end section 2g, 2g.1 again (cf. shape of the section [K1]) or it can also, as illustrated by FIG. 9, be inclined as section {K1} by the indicated second diversion angle {ε}<15 degrees with regard to the first end section 2g, 2g.1.

The end section 4** of the second cylindrical lug 4* comprises an annular circumferential second chamfer 4f on the front side radially outside following the stop face 4e, which extends against the stop face 4e under an angle of chamfer λ. The circumferential penetration area formed by the chamfer 4f and the envelope of the second cylindrical lug 4* at the second diameter d2 is formed like a rounded third circumferential edge U3. The angle of slope λ is dimensioned such that the third circumferential edge U3, viewed in radial direction, is shifted outwards as far as possible and guided as near as admissible towards the shape of the transition area 2e determined by the radius of curvature r1 and forms an annular circumferential centring point Z with said area there. Thereby, the second closing element 4 is in any case sufficiently coaxially centred just before the insertion into its abutment position such that the first and the second circumferential edge U1, U2 communicate in the required manner, also if unintended wedging of the second closing element 4 should occur due to deficient guiding at the guiding places intended therefor according to plan.

The end on the leakage cavity side of the second choke gap D2 designated in FIG. 5 is largely tightly closed (as far as this is generally possible in case of abutment of metal against metal) by the abutment position (cf. FIG. 4) of the second closing element 4 at the stop face 2e* on the valve housing side. Cleaning liquid of the first seat cleaning flow R1 cannot enter into the second choke gap D2 and thus into the area of the second seal 7 any more. Even in case of high damage or complete removal of the second seal 7, if applicable, a penetration for cleaning liquid is not possible any more.

According to FIG. 5 the second closing element 4 assumes its second seat cleaning position after implementation of a second partial lift. In this, the second seal 7 is spaced from an opening slope 2i by a gap, and the second cylindrical lug 4* forms the second choke gap D2 together with the annular recess 2d, through which the second seat cleaning flow R2 can be approximated to the exposed seat 2b, across which it can flow, and led into the leakage cavity 5. The second seat 2b is configured cylindrical and is formed by the annular recess 2d. The second closing element 4 comprises the second seal 7, which according to FIG. 2 (closed position) seals radially against the second seat 2b in sliding engagement.

Figure 7A:
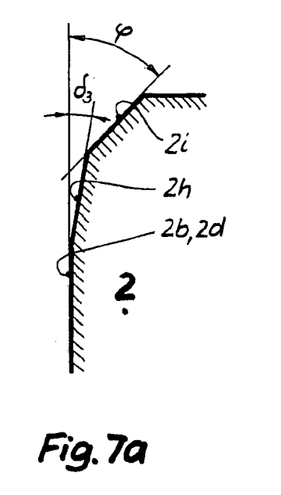
FIGS. 7a-7c each in schematic and enlarged illustration the contour of the seat area for the second closing element of the double seat valve according to FIG. 2 or FIG. 6.

It becomes further apparent from FIG. 5 and FIG. 7a that also the second seat 2b comprises an inlet slope 2h protecting the seals, the latter being pitched with regard to the second seat 2b by a third angle of pitch $\delta_3$, preferable in the range of 7.5 to 15 degrees, again preferable with $\delta_3$=10 degrees. In order to reduce the partial lift T2 required to expose the second seat 2b, the second inlet slope 2h expands at its end directed towards the second closing element 4 into the opening slope 2i indicated above, the latter being pitched with regard to the second seat 2b by an opening angle φ preferably in the range of 35 to 55 degrees and here again preferably with φ=45 degrees.

The second seat cleaning flow R2 exits the second choke gap D2 (FIG. 5) at first along the annular recess 2d and is diverted through the transition area 2e towards the centre of the leakage cavity 5. A direct splashing of the seat area of the first seal 6 is safely prevented thereby. The first closing element 3 is axially positioned during the seat cleaning of the second closing element 4 such that the second seat cleaning flow R2 can flow across the first closing element 3 unimpeded. Depending on the prevailing pressure conditions and under the influence of gravity, when the double seat valve 1 is arranged according to the position in the drawing, the liquid jet assumes a slightly parabola-shaped course such that is flows tangentially over the front face of the first closing element 3 with its chamfer 3, which is desirable for reasons of cleaning technique. By this flow guiding and positioning of the first closing element 3 even a suction effect on the first seat area of the first seal 6 is achieved such that both in case of loss or considerable damage of the first seal 6 no cleaning agent can enter into the adjacent first valve housing part 1a.

Figure 7B:
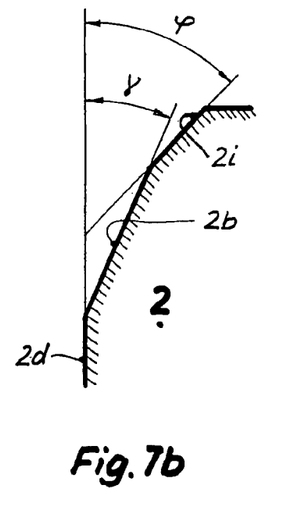

The second seat 2b can also be configured cone-shaped according to FIG. 7b, wherein it is inclined with regard to the cylindrical recess 2d by a seat angle γ. The second seal 7 of the second closing element 4 then seals axially/radially against the second seat 2b in sliding/pressing engagement. A second inlet slope for the second seal 7 is not required in this case, but the second seat 2b can expand at its end directed towards the second closing element 4 into the opening slope 2i indicated above with the opening angle φ quantified there.

Figure 7C:
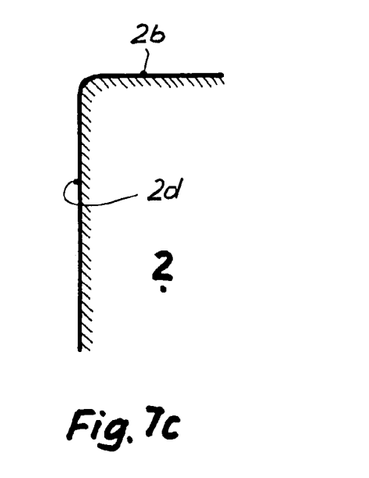

The double seat valve 1 according to the invention also allows a configuration of the second seat 2b vertically to its longitudinal axis (FIG. 7c), wherein the second seal 7 arranged in the second closing element 4 axially seals against this second seat 2b in pressing engagement. However, this solution is only possible, if the axially acting second seal 7 is such ductile that the abutment position of the second closing element 4 is still ensured at the stop face 2e* in the area of the transition area 2e exiting into the first seat 2a.

Figure 6:
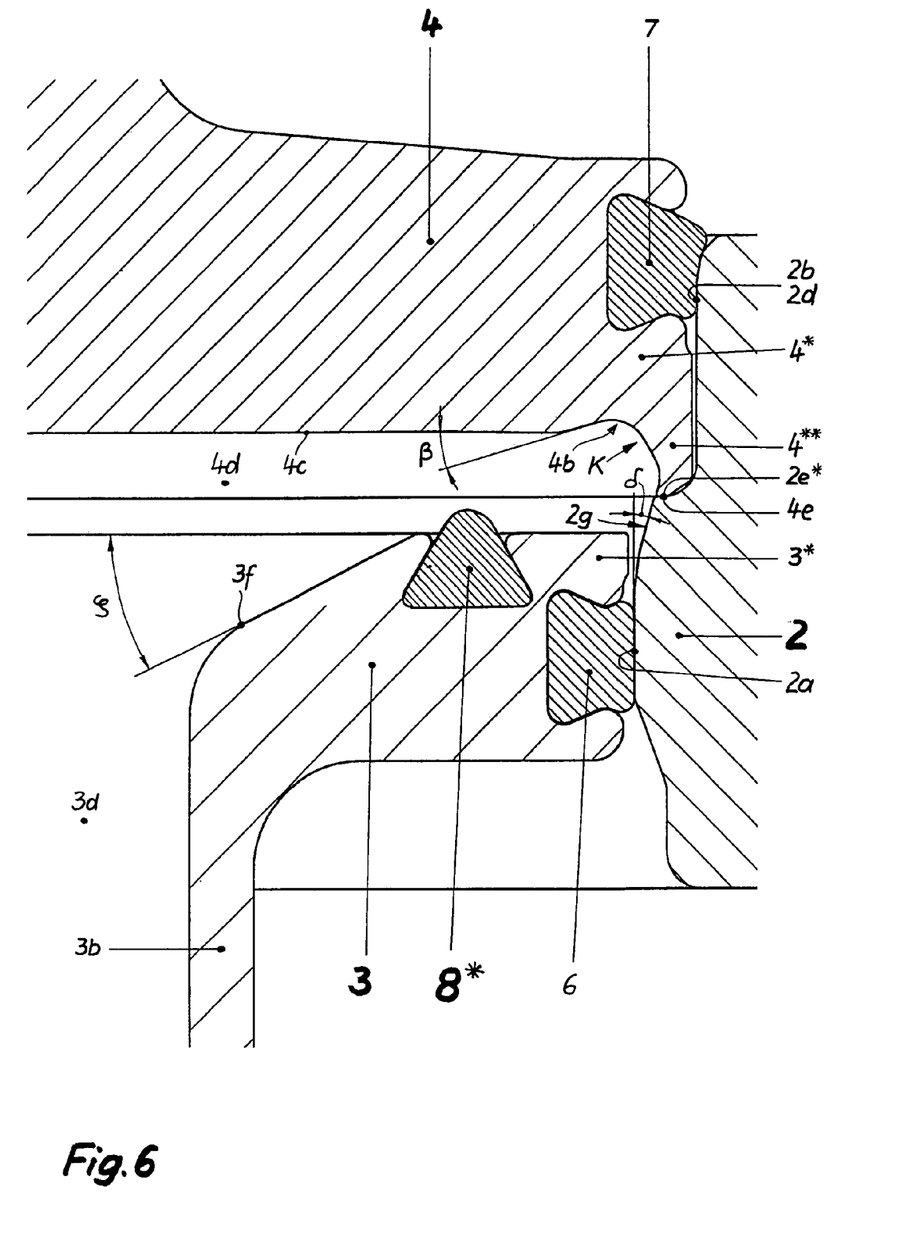
FIG. 6 in longitudinal and cut-out section the double seat valve with cleanable seats according to the invention in a second embodiment, wherein the alternative intermediate seal is arranged in the first closing element lying at the bottom and the double seat valve is in its closed position.

It can be taken from FIG. 6 that the double seat valve 1 with cleanable seat according to the invention in its second embodiment, in which an alternative intermediate seal 8* is arranged in the first closing element 3, comprises without limitation all features substantial for the invention and specified in connection with the first embodiment. The alternative intermediate seal 8* communicates and co-operates in this case with the front face 4c of the recess 4d in the second closing element 4.

Figures 10A, 10B:
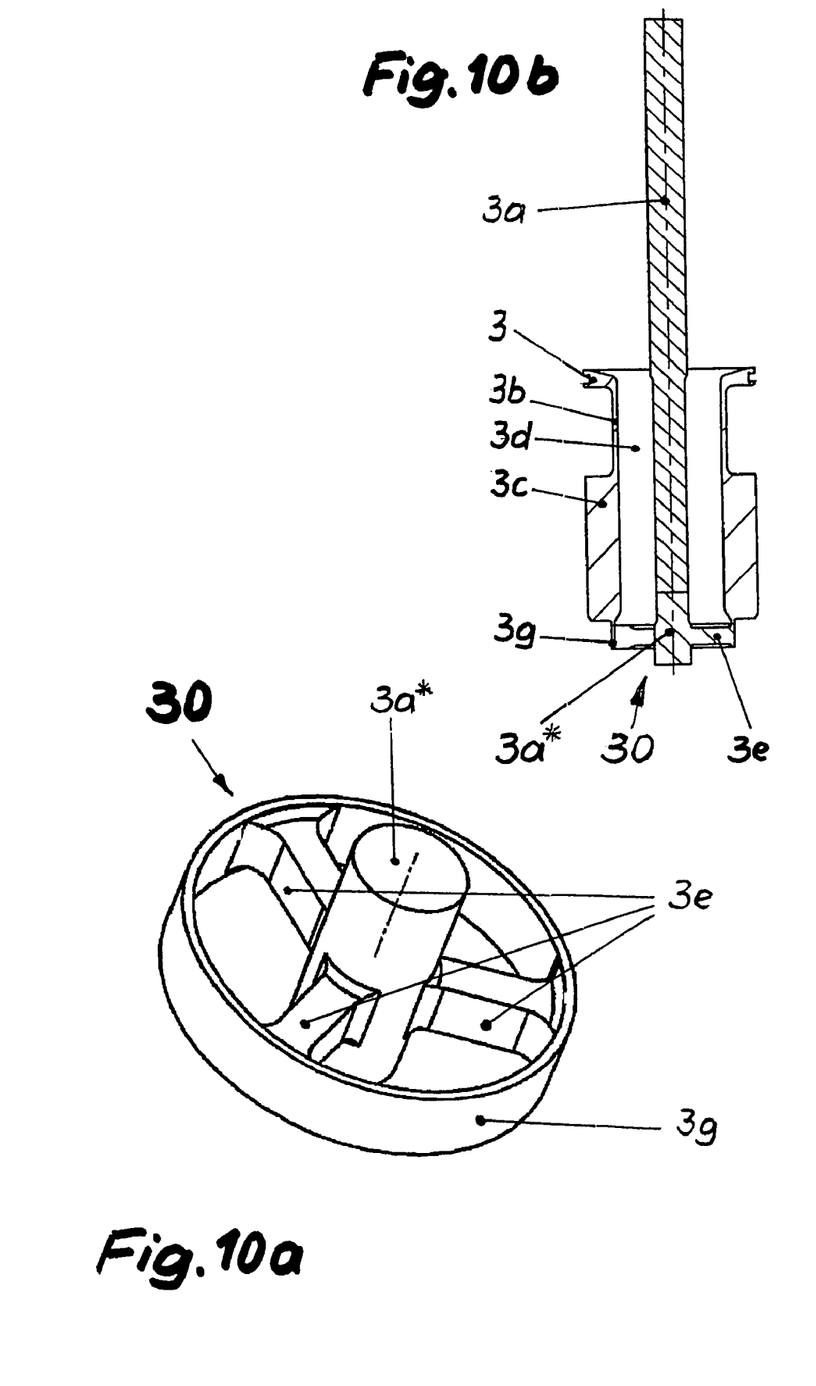
FIG. 10a in perspective illustration an integral welding part consisting of three traverses each fixedly connecting a shifting rod section with a ring, for connecting the first valve rod with a pressure balance piston arranged at the end of the first closing element remote from the leakage cavity.
FIG. 10b in vertical centre section the composite construction of the first closing element and the indirectly adjacent pressure balance piston, welding part and first valve rod.

In FIG. 10a the integral welding part 30 is illustrated, which is formed by the shifting rod section 3a*, the three traverses 3e and the ring 3g. The three traverses 3e arranged equally spaced across the circumference of the shifting rod section 3a* are fixedly connected therewith. They are each radially outside fixedly connected with the circumferential ring 3g as well. The welding part 30 is welded on the outside via the ring 3g to the pressure balance piston 3c bounding the section of the discharge bore 3d remote from the leakage cavity (cf. FIG. 10b) and on the inside via the shifting rod section 3a* to the first shifting rod 3a. In this the ring 3g is enlarged in its inner diameter with regard to the diameter of the discharge bore 3d with interposition of a conical expanding transition area such that the inner passage of the discharge bore 3d is not narrowed by the traverses 3e.

LIST OF REFERENCE NUMBERS OF THE USED ABBREVIATIONS

1 Double seat valve
10 Valve housing
1a First valve housing part
1b Second valve housing part
2 Seat ring
2a First seat (cylindrical seat)
2b Second seat (axial; radial; axial/radial)
2c Connecting opening
2d Annular recess
2e Transition area
2e* Stop face on the valve housing side
2g First end section (first inlet slope)
2g.1 First envelope of cone
2g.2 Second envelope of cone
2h Second end section (second inlet slope)
2i Opening slope
3 First closing element (slide piston)
3* First cylindrical lug
3a First shifting rod
3b Connecting part
3c Pressure balance piston
3d Discharge bore
3f Chamfer
30 Welding part
3a* Shifting rod section
3e Traverse
3g Ring
4 Second closing element
4* Second cylindrical lug
4** End section
4a Second shifting rod
4b Diversion area
4c Front face
4d Recess
4e Stop face (on closing element side)
4f Second chamfer
5 Leakage cavity
6 First seal (radial)
7 Second seal (axial; radial; axial/radial)
8 Intermediate seal (in second closing element 4)
8* Alternative intermediate seal (in first closing element 3)
a Radial width of the transition area
b Width (stop face on closing element side at end section 4**)
d1 First diameter
d2 Second diameter
r1 Radius of curvature (of the transition area 2e)
r2 Radius of curvature (first inlet slope 2g; 2g.1, 2g.2)
r3 First corner rounding (on housing side, seat ring 2)
r4 Second corner rounding (second closing element 4)
r5 First diversion radius
r6 Second diversion radius
x Axial safety distance
Y Axial undercutting distance
α First angle of diversion
β Fourth angle of diversion
γ Seat angle
δ Angle of pitch (of the first inlet slope 2g)
$δ_1$ First angle of pitch (first conical section 2g.1)
$δ_2$ Second angle of pitch (second conical section 2g.2)
$δ_3$ Third angle of pitch (of the second inlet slope 2h)
ε Second angle of diversion
ξ Angle of inclination
λ Chamfer angle
φ Opening angle
D1 First choke gap
D2 Second choke gap
H Complete opening lift (completely open position)
K Contour of diversion area 4b
K1 First section (first straight line)
K2 First radius of diversion r5
K3 Third section (second linear line)
K4 Second radius of diversion r6
K5 Fifth section (third linear line)
Kn Last section
R1 First seat cleaning flow
R2 Second seat cleaning flow
T1 First partial lift (first partially open position/first seat cleaning position)
T2 Second partial lift (second partially open position/second seat cleaning position)
U1 First circumferential edge
U2 Second circumferential edge
U3 Third circumferential edge
Z Centring point

The invention claimed is:

1. Double seat valve comprising two valve housing parts, and first and second closing elements (3, 4) arranged in series and movable with regard to each other, which prevent in a closed position of the double seat valve (1) fluids from one of the valve housing parts (1a; 1b) flowing into the other of the valve housing parts (1b; 1a), which define in the closed position, as well as in the open position, a leakage cavity (5), which is connected with the surroundings of the double seat valve (1), wherein, in the closed position, the first closing element (3), which is formed as a slide piston, is received in sealing manner in a connecting opening (2c) extending from one of the valve housing parts to the other and connecting the valve housing parts (1a, 1b) with each other and which comes to abut, in a sealing manner in the course of its opening movement, the second closing element (4), which is associated with a second seat (2b), through an intermediate seal (8; 8*) acting between the closing elements (3, 4), and the second closing element is also transferred to an open position (H) during a further opening movement, the first closing element (3) comprising a first seal (6), which seals radially against a cylindrical first seat (2a) formed in the connecting opening (2c), the cylindrical first seat being coaxial with the second seat, each of the closing elements (3, 4) being able to be transferred independently from the other by a partial lift to a seat cleaning position in order to rinse its respective coaxial seat (2a, 2b), wherein the second closing element (4) can be transferred to its seat cleaning position by a second partial lift (T2) in the same direction as the opening movement and the first closing element (3) can be transferred to its seat cleaning position by a first partial lift (T1) in the direction opposed to the opening movement, wherein the first partial lift (T1) generates a first seat cleaning flow (R1), and the second partial lift (T2) generates a second seat cleaning flow (R2), a cylindrical lug (3*, 4*) being arranged at each closing element (3, 4) on a side of the closing element adjacent to a leakage cavity defined between the closing elements, each cylindrical lug forming an annular choke gap (D1, D2) with the connecting opening (2c) that is the smallest gap between the connecting opening and the closing element on which the cylindrical lug is formed when the closing element is in its seat cleaning position, the first seat (2a) comprising a diameter that is smaller than the diameter of an annular recess (2d) in the connecting opening (2c), the annular recess being associated with the second closing element (4), and a transition surface (2e) between the first seat (2a) and the annular recess (2d), characterised in that, in the closed position of the second closing element (4), a stop face (4e) arranged at a front face of the cylindrical lug (4*) of the second closing element abuts against the transition surface (2e; 2e*), and in that, directly adjacent to the first seat (2a, 2g), in the front face of the second cylindrical lug (4*), a central recess (4d) is provided, which starts radially on the outside with a rotationally symmetrical fluid flow diversion area (4b) having a surface contour (K) and has a front face (4c) oriented substantially perpendicular to the longitudinal axis of the second closing element (4), said fluid flow diversion area (4b) leading into the front face (4c), the fluid flow diversion area (4b) and the stop face (4e) form a second rounded edge (U2), which is directly adjacent to a first end section (2g) of the first seat (2a) in the closed position of the second closing element (4), viewed in vertical center section, the fluid flow diversion area (4b) comprises a contour (K) with an uncurved portion, wherein a direction vector of a fluid flow outlet of the fluid flow diversion area (4b) points into a discharge bore (3d) centrally arranged in the first closing element (3) without intersecting with either the first closing element (3) in an area of the first closing element bounding the leakage cavity (5) or the intermediate seal (8; 8*) and thus without forming impact pressure, and wherein a frontal boundary of the first closing element (3) directed towards the leakage cavity (5) has an axial safety distance (x) from a direction vector at an exit of the transition area (2e), the exit of the transition area being formed as a first rounded edge (U1) adjacent to the first end section (2g)), and wherein the connecting opening (2c) is defined in part by a surface of an end section (2g) adjacent to the second closing element (4) when the second closing element is in its closed position, the diversion area (4b) has a fluid flow inlet section (K1) having a surface, and, when the second closing element is in its closed position, the surface of the inlet section (K1) is either in alignment with the surface of the end section (2g) of the connecting opening or makes an angle of less than 15 degrees with the surface of the end section (2g) of the connecting opening, whereby, when the first closing element is in its seat cleaning position, the first seat cleaning flow flows from the choke gap associated with the first closing element and through the fluid flow diversion area to the leakage cavity, the first seat cleaning flow entering the fluid flow diversion area shock-free.

2. Double seat valve according to claim 1, wherein the intermediate seal (8) is arranged in the front face (4c).

3. Double seat valve according to claim 2, wherein the safety distance (x) is at least as large as the sum of all production tolerances of the components of the double seat valve (1), which determine in the closed position of the first closing element (3) the smallest axial distance thereof to the transition area (2e).

4. Double seat valve according to claim 1, wherein an alternative intermediate seal (8*) is arranged in the frontal boundary of the cylindrical lug (3*) of the first closing element (3) and co-operates with the front face (4c).

5. Double seat valve according to claim 4, wherein the safety distance (x) is at least as large as the sum of all production tolerances of the components of the double seat valve (1), which determine in the closed position of the first closing element (3) the smallest axial distance thereof to the transition area (2e), plus the axial distance by which the alternative intermediate seal projects from the front side of the cylindrical lug (3*) of the first closing element (3).

6. Double seat valve according to claim 1, wherein a direction vector at one end of the contour (K) is flush with the first end section (2g).

7. Double seat valve according to claim 1, wherein a direction vector at one end of the contour (K) deviates from a direction vector of the first end section (2g) by a first diversion angle (c) of less than 15 degrees.

8. Double seat valve according to claim 1, wherein the first end section (2g) is formed as conical section, which connects to the first seat (2a) with an angle of curvature (r2) and opens towards the second closing element (4).

9. Double seat valve according to claim 8, wherein the first end section (2g) is formed by at least one envelope of cone.

10. Double seat valve according to claim 1, wherein a first rounded edge (U1) formed by the transition area (2e) and the first end section (2g) is rounded with a smallest-possible corner rounding (r3).

11. Double seat valve according to claim 1, wherein the annular recess (2d) forms an obtuse or a right first diversion angle (α) with an end of the transition area (2e) that is adjacent to the first end section (2g).

12. Double seat valve according to claim 1, wherein the second rounded edge (U2) is rounded with a smallest possible second corner rounding (r4).

13. Double seat valve according to claim 1, wherein the fluid flow diversion area (4b) undercuts the front face (4c) by an axial undercutting distance (y).

14. Double seat valve according to claim 1, wherein the contour (K) comprises a sequence of sections (K1, K2, K3, . . . , Kn), of which a first section (K1), a third section (K3) and a fifth and last section (K5=Kn) leading out of the front face (4c) are each configured linear, and that the linear sections (K1, K3, K5) are connected with each other through second and fourth sections (K2, K4), which tangentially round the contour with largest-possible first and a second diversion radii (r5, r6).

15. Double seat valve according to claim 1, wherein the contour (K) consists of one of: a) a sequence of curved sections (K1, K2, K3, . . . , Kn), which each have a common tangent at transition points with adjacent sections, b) a single section of continuously varying curvatures, and c) a single section with constant curvature.

16. Double seat valve according to claim 1, wherein the direction vector of the outlet of the diversion area comprises a diversion angle ($\beta$) with regard to the front face (4c) in the range of $5 \leqq \beta \leqq 20$ degrees.

17. Double seat valve according to claim 1, wherein a discharge opening (3d) connects the leakage cavity (5) with the surroundings of the double seat valve (1), and that the frontal boundary of the first closing element (3) directed towards the leakage cavity (5) comprises a chamfer (3f) extending downward circumferentially on all sides towards the discharge opening (3d).

18. Double seat valve according to claim 1, wherein the second seat (2b) is configured cylindrical and formed by the annular recess (2d), and that the second closing element (4) comprises a second seal (7), which seals against the second seat (2b) in sliding engagement.

19. Double seat valve according to claim 1, wherein the second seat (2b) is arranged perpendicular to the longitudinal axis of the double seat valve (1), and that the second closing element (4) comprises a second seal (7), which seals axially against the second seat (2b) in pressing engagement.

20. Double seat valve according to claim 1, wherein an end section (4**) of the second cylindrical lug (4*) comprises an annular circumferential second chamfer (4f) radially on the outside following the stop face (4e), which extends from the stop face (4e) at a chamfer angle ($\lambda$), and which is dimensioned such that a third circumferential edge (U3) formed by rounding between the second chamfer (4f) and the second diameter (d2) of the second cylindrical lug (4*) is shifted, viewed in radial direction, outwards as far as possible and as close as admissible to the shape of the transition area (2e) determined by the radius of curvature (r1) and forms an annular circumferential centering structure (Z) there.

* * * * *